United States Patent [19]
Elmore

[11] 3,792,270
[45] Feb. 12, 1974

[54] SPACECRAFT VELOCITY COMPONENT SENSOR

[75] Inventor: Robert E. Elmore, Tulsa, Okla.

[73] Assignee: Avco Corporation, Tulsa, Okla.

[22] Filed: June 17, 1970

[21] Appl. No.: 46,901

[52] U.S. Cl. ............ 250/83.3 R, 33/300, 73/194 F, 244/1 SA, 250/83.6 R
[51] Int. Cl. ........................ G01c 21/24, G01p 5/20
[58] Field of Search ......... 33/204 D; 73/180, 194 F; 250/83.3 R; 244/1 SA, 1 SS

[56] References Cited
UNITED STATES PATENTS

| 3,525,866 | 8/1970 | Sagalyn et al. | 250/83.3 R |
| 3,276,725 | 10/1966 | Bennett | 244/1 SA |
| 3,188,472 | 6/1965 | Whipple | 250/83.3 R |

*Primary Examiner*—Robert B. Hull
*Attorney, Agent, or Firm*—Charles M. Hogan; Eugene C. Goodale

[57] ABSTRACT

An omnidirectional sensor to detect changes in spacecraft attitude is disclosed. The sensor provides the capability of sensing through 360° the direction of the craft velocity component in its own principal plane when coupled with an even $2(n+1)$ port array. The sensor compensates for undesirable effects of intrinsic isotropic velocities of charged particles used in attitude sensing and the undesirable effects of electromagnetic radiation and energetic charged particles which ordinarily degrade accuracy.

9 Claims, 8 Drawing Figures

PATENTED FEB 12 1974 3,792,270

INVENTOR.
ROBERT E. ELMORE
BY *Charles M. Hogan*

*Eugene C. Goodale*
ATTORNEYS.

INVENTOR.
ROBERT E. ELMORE

SPACECRAFT VELOCITY COMPONENT SENSOR

BACKGROUND OF THE INVENTION

This invention relates in general to a system for sensing the attitude of spacecraft and more particularly concerns apparatus and system utilizing ion sensing to determine the angular separation of the spacecraft axis relative to the craft velocity vector as measured in the plane of the sensor ports.

At the present time, several different techniques have been developed to sense and control spacecraft attitude. Of the previous different techniques developed, ionic attitude sensing for spacecraft has an inherent advantage over any other instrument in that the attitude of the spacecraft or vehicle can be determined relative to the vehicle velocity vector through the medium surrounding the spacecraft. As used herein, the term "attitude" is defined as the angular separation of the vehicle axis relative to the component of the velocity vector which lies in the plane of the sensor ports. The ionic sensors utilize the naturally occurring positively charged ions of the upper atmosphere. These ions are the result of atmospheric bombardment by solar ultraviolet rays and occur universally above a nominal attitude of 50 kilometers, but exhibit a widely varying density depending on geographical position, altitude and local time.

The upper atmosphere of the earth extending outward from about 50 kilometers to several thousand kilometers contains a plasma composed of electrons, ions and neutral gases. Ionization of the constituents is produced principally by photoionization due to solar ultraviolet radiation; ions generated are in approximate thermal equilibrium with their environment. Although the motion of a charged particle in the earth's ionospheric region is more complex than that of a neutral particle, the energy distribution and corresponding velocity distribution of charged and neutral particles is comparable. Such ions are often commonly referred to as thermal ions and typically obey the classical kinetic theory of gases characterized by Maxwell's velocity distribution function.

The velocity distribution of ions is characterized by the Maxwell velocity distribution functions:

$$\rho = N_o (M/2 \pi k T)^{3/2} \exp [-(M/2k T)V^2] \text{tm} \quad (1)$$

with the average particle velocity shown by $$\overline{V} = (8 k T/\pi M)^{1/2} \quad (2)$$

where:
$\rho$ = the density of velocity points at the velocity $V$ where $V^2 = V_x^2 + V_y^2 + V_z^2$
$N_o$ = the total number of velocity points that may be considered
$M$ = the particle mass
$k$ = Boltzmann's Constant ($1.380 \times 10^{-23}$ Joules/molecule – °K)
$T$ = the absolute temperature (°K)

As shown by equations 1 and 2 the average particle velocity is a function of the several variables, particle mass M and temperature T; in addition, particle velocity is also a function of the earth's geographical location and altitude which is related to both particle mass and temperature. In general, for a constant polar orbit, ionic temperature and density are at a maximum in the equatorial regions and at a minimum in the polar regions with variations in the average ionic mass occurring with altitude changes.

A 2-port charged particle sensor determines angular measurement by measuring current differences generated by ions striking two targets, see FIG. 1, in motion relative to the surrounding medium. The current generated on the forward surface of a target of Area A moving through a medium of charged particles at an angle $\beta$ with respect to the normal of the target may be derived by utilizing the Maxwellian velocity distribution function. The current thus generated may be shown as:

$$I = N_o A Q W \cdot \cos\beta [½+ (erf\ \psi/2) + (e^{-\psi^2}/2\ \psi\ \sqrt{\pi})] \quad (3)$$

where:
$I$ = the current
$A$ = the target area
$Q$ = the ionic charge
$W$ = the vehicle velocity
$e$ = exp = exponential function
$\psi$ = the function $(2/\sqrt{\pi}) \cdot (W/\overline{V}) \cdot \cos \beta$ $$erf = \text{error function} = \frac{2}{\sqrt{\pi}} \int_0^x e^{-t^2} dt$$

Equation 3 approaches
$$I = N_o A Q W \cos \beta \quad (4)$$

where the vehicle velocity W exceeds the average particle velocity $\overline{V}$ by two to one or more, and the angle $\beta$ is not large. Equation 4 is satisfactory only for small angles at altitudes of 1,000 kilometers or less.

The ion current generated by a single target is not sufficient to determine the relative attitude angle. The necessary and sufficient conditions for relative attitude angle determination is established by two targets forming a wedge configuration. The angle $\alpha$ is the wedge half angle, formed by the intersection of the two targets, A is the target area while W is the velocity vector as projected on the plane perpendicular to the edge of the wedge differing from the alignment axis by the angle $\theta$ relative to the wedge bisector. The ion current at low altitude operation for target 1 is given by:

$$I_1 = N_o A Q W \cdot \sin (\alpha - \theta) \quad (5)$$

while the current for target 2 is given by
$$I_2 = N_o A Q W \cdot \sin (\alpha + \theta) \quad (6)$$

for any angle $\theta$. Distinct target current ratios are generated but it is difficult to divide by electronic analog techniques. A simple difference between the target currents, if displayed, would suffice if the ion density, $N_o$, were a constant. However, ion density, being related to altitude, geographical position and siderial time, does vary through several decades. The difference concept does, however, yield a unique and usable result where the difference in target currents is electronically normalized by reducing the sum of the two target currents to a constant and simulating division.

The difference concept of transforming the sum of the target currents into a constant is dependent on the wedge configuration geometry typically used in charged particle sensors. The current generated in two targets having a wedge configuration may be described by:

$$(\pm I_1 \mp I_2)/(I_1 + I_2) = \tan \theta / \tan \alpha \quad (7)$$

Since tan α is a constant, it is replaced by a constant, $K_2$, and both the numerator and denominator of equation 7 are multiplied by another constant, $K_1$, which is used to obtain a new constant, $K_3$, such that:

$$\pm I_1 \mp I_2 = (K_3/K_1 K_2) \cdot \tan \theta = K \cdot \tan \theta \quad (8)$$

Utilizing the above described theory, ionic attitude sensors for planetary orbiting vehicles have been developed. The sensors utilize ion current generated by the impingement onto the targets due to vehicle velocity and orientations. The current in these sensors is used to obtain an output signal directly relating vehicle axis direction to the vehicle velocity vector. This prior type sensor was limited to usage in environments containing ions whose intrinsic isotropic velocities were small relative to the vehicle velocity and also limited to small angles of attitude relative to the vehicle velocity vector. The early ionic attitude sensors utilizing two ports would thus only function efficiently within a narrow range of angles around zero degrees from the velocity vector. In addition, these sensors become non-effective as the vehicle reaches higher altitudes since ions at the high altitudes cannot be considered to be standing still and thus errors would be present.

Accordingly, it is an object of this invention to provide an ionic sensor capable of compensating for particle velocity distribution effects of particles composing a plasma medium and accurately sensing attitude with respect to the vehicle velocity vector through 360° in any plane.

Another object of the invention is to provide an ionic sensor which would be effective to sense through large attitude angles as would be encountered in guidance from orbit to re-entry or if it is desired to acquire a particular attitude when the initial attitude is unknown.

Yet another object of this invention is to provide an ionic sensor capable of 360° operation in the plane of the sensor for use in the earth's atmosphere and in near earth planetary atmospheres.

Another object of this invention is to provide an omnidirectional sensor which utilizes either naturally occurring positive ions or electrons in the medium surrounding the vehicle.

A still further object of this invention is to provide an ionic sensor which compensates for undesirable effects of intrinsic isotropic velocities of charged particles.

Yet another object of this invention is to provide an ionic sensor which compensates for undesirable effects of electromagnetic radiation and energetic charged particles which ordinarily degrade accuracy.

A still further object of this invention is the development of ionic sensing means for use in a system for orbital guidance with distinct advantages over prior known systems.

SUMMARY OF THE INVENTION

This invention provides an improved ionic sensor and sensor system for use in spacecraft guidance systems. The ionic sensor employs a series of $2(n+1)$ ports which are sampled in a 180° sequence. A difference current is obtained between the two ports separated by 180° to obtain thermal ion cancellation and this difference is then differenced with a similar adjacent pair of ports sequentially to determine the direction of the projected relative velocity through 360°.

Other details, uses, and advantages of this invention will become apparent as the following description of an exemplary embodiment thereof presented in the accompanying drawings proceeds.

BRIEF DESCRIPTION OF THE DRAWINGS

The accompanying drawings show a present exemplary embodiment of this invention in which.

DESCRIPTION OF THE ILLUSTRATED EMBODIMENT

In the design of a 360° ionic sensor and sensing system with thermal ion compensation, it can be mathematically shown that a target of Area A moving through a spacial medium at an angle β with respect to the normal of the target will generate on the forward surface of a current given by:

$$I = (N_o A Q \bar{V}/4) [\sqrt{\pi} \psi (+ 1 + \text{erf } \psi) + e^{-\psi^2}] \quad (9)$$

the current generated at the rear of the target may be shown to be:

$$I = (N_o A Q \bar{V}/4) [\sqrt{\pi} \psi (- 1 + \text{erf } \psi) + e^{-\psi^2}] \quad (10)$$

The currents shown in equations 9 and 10 are additive for a single target. Physical separation of the front and rear surfaces, as in this invention, allows each current to be processed and treated separately. The current generated between the front and rear target area is given by the difference between equations 9 and 10 as:

$$I = N_o A Q W \cdot \cos \beta \quad (11)$$

Utilizing the current generating capability of the separate targets in the arrangement shown in FIGS. 2–5 eliminates target current generation dependence on ion thermal velocity; i.e., intrinsic isotropic velocity as required in prior inventions. Freedom from the dependence on thermal ion response allows achievement of 360° direction sensing capabilities when coupled with a $2(n+1)$ port array where $n$ is any positive number other than 0.

Figure 1:
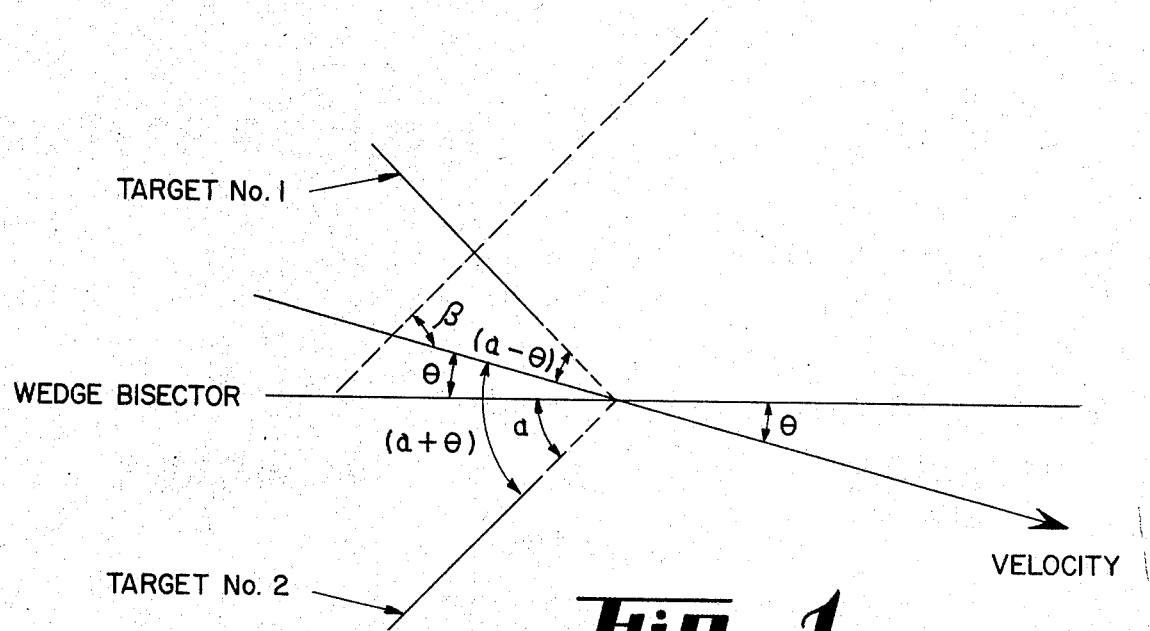
FIG. 1 is a diagrammatic representation of a line projection in the plane of the sensor ports showing the attitude factors utilized in the mathematical derivation of collectable current.
Figure 3:
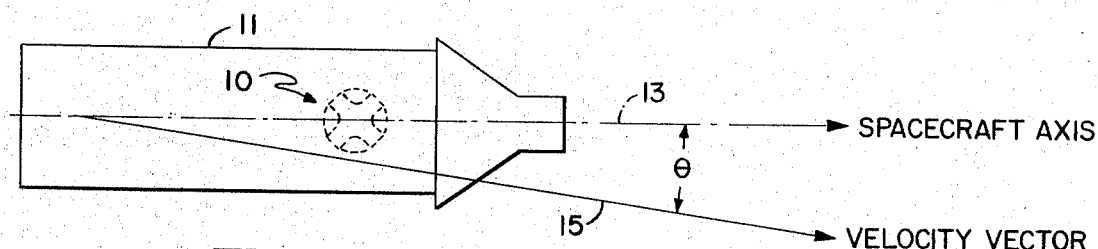
FIG. 3 is a diagrammatic representation showing the ion sensor of FIG. 2 and its use on a spacecraft.
Figure 2:
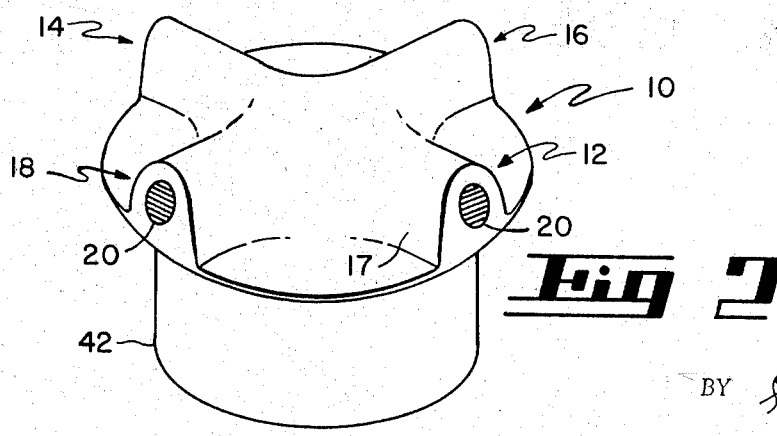
FIG. 2 is a perspective view of an ion sensor illustrating one embodiment of this invention.

Reference is now made to FIG. 2 which illustrates a perspective view of one exemplary embodiment of the improved ionic attitude sensor of this invention, which is designated generally by the reference numeral 10. FIG. 3 diagrammatically shows the ion sensor 10 of FIG. 1 in relation with a spacecraft 11. The ion sensor 10 will produce an output voltage representative of the angle $\theta$ between the axis 13 of the spacecraft and the actual direction of the spacecraft flight through an ionized atmosphere in the direction of the velocity vector 15. Thus, the ion sensor 10 provides a means of angle $\theta$ sensing relative to the spacecraft's environment rather than through fixed references such as horizon sensors, stable platforms, stellar navigation, or the like. Stated in other terms, this sensor 10 permits the determination of the angular separation, angle $\theta$, between the axis 13 of a vehicle in motion through a partially ionized gaseous medium and the velocity vector 15 of the vehicle through the medium as measured in the plane of the ports when the sensor 10 is attached to the vehicle with the sensor axis normal to the vehicle axis.

The ionic attitude sensor 10 is comprised of four sampling ports designated respectively 12, 14, 16 and 18 which are housed in an outer casing or housing 17. As seen in FIGS. 2-5, the ports are arranged in a plane about a central axis, the plane being normal to the central axis, with the port openings directed radially outwardly and equally spaced at angular intervals about the port plane. Ports 12 and 14 (FIG. 4) form a pair of target areas for obtaining front to rear current differences and ports 16 and 18 form another pair of target areas. Ions entering the sensor 10 are allowed to enter only the active ion port, all other ports during their non-active periods reject ions. Each port is sequentially activated by a suitable electronic means which will be described herebelow. Each respective port or target area is covered with a metallic mesh 20 to complete the external ground plane and confine internal electric fields.

Each port has a control grid respectively designated 22, 24, 26 and 28 and an accelerator grid respectively designated 32, 34, 36 and 38. It should be noted that all grids are at a negative potential, however, each control grid may be switched to a positive potential to stop ion flow. All the various grids are suitably insulated from the housing 17 of the ion sensor 10.

Ions pass through an active port and enter an ion flow chamber 30 and are directed through an accelerator grid 40, which is maintained at a fixed high negative potential, to a detector, in this embodiment the first dynode 41 of a suitable ion-electron multiplier 42.

Figure 6:
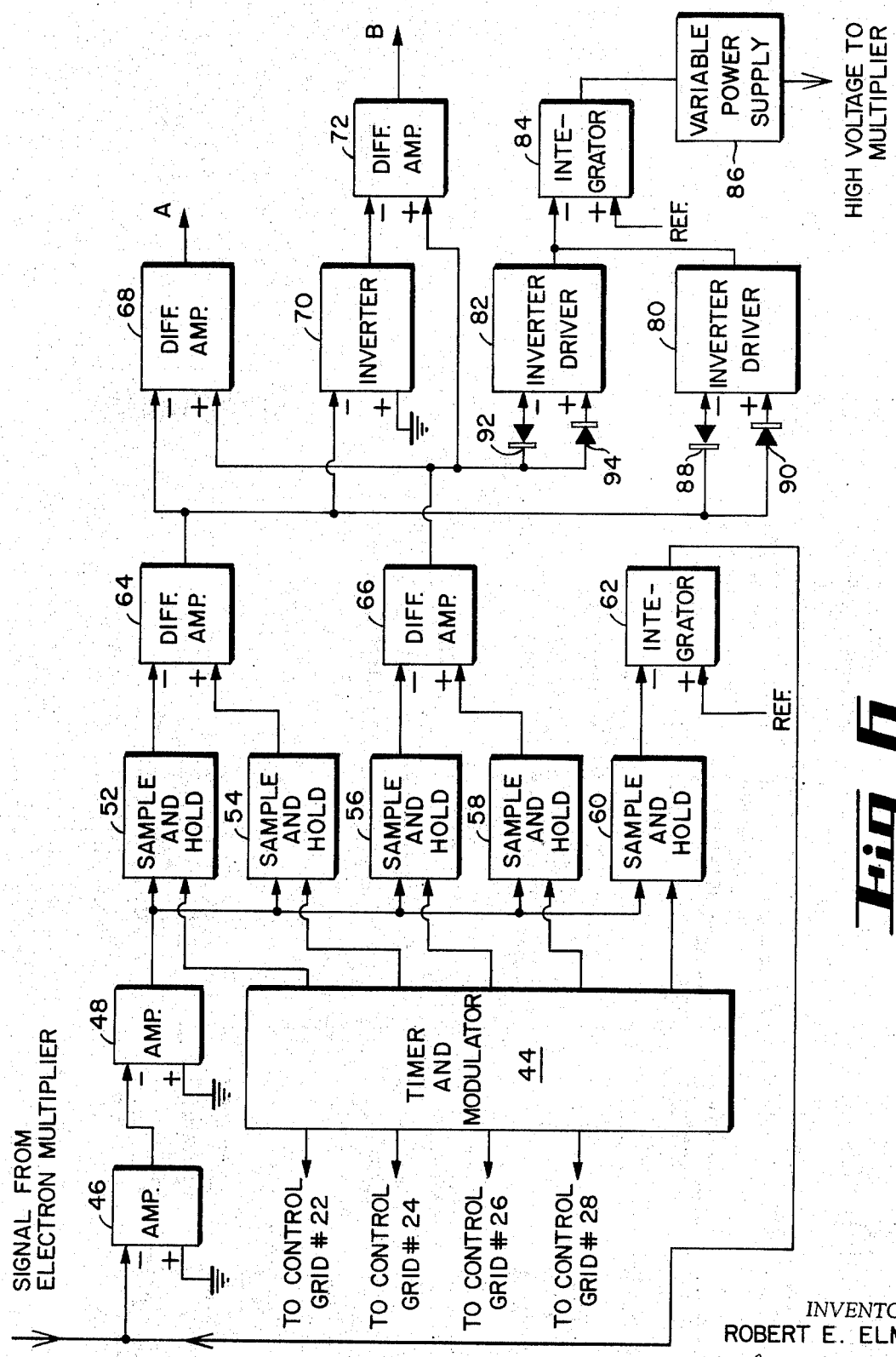
FIG. 6 is an electrical block diagram of the ionic sensor sensing circuit.

As seen in FIG. 6, a timer and modulator 44 are connected with each control grid to sequentially activate a port to permit ion transmission therethrough. A typical sequential sampling pattern utilized in this invention is:

1. Port 12 transmits ions, all others reject
2. Port 14 transmits ions, all others reject
3. Port 16 transmits ions, all others reject
4. Port 18 transmits ions, all others reject
5. No transmission of ions, base reference established.

The timing circuit of the timer and modulator 44 develops the modulation pulses to be applied to the sensor control grids 22-28 and simultaneously supplies the gating pulses for the sample and hold circuits 52-60. The non-transmission period is used to cancel background response not associated with the ionic current. In other words, the signal developed by the sample and hold circuit 60 during the non-conduction of ions is applied to an integrator amplifier 62. The other input of the integrator amplifier 62 is connected to a reference signal. A signal from the integrator amplifier 62 is generated sufficiently to offset any undesirable signals arriving at amplifier 46 to eliminate or cancel out any signal error due to inputs not directly related to the ionic current. The background noise which is cancelled is any "non-angle related response" such as responses from ultraviolet and visible light, energetic radiation, electromagnetic noise, etc.

A port ion transmission on-time is, typically, 6 milliseconds with an off-time of 24 milliseconds. Each pulse of ions from the respective port is delivered to the dynode 41 of the ion-electron multiplier 42 where conversion to secondary electrons occurs which are in turn multiplied by the succeeding dynodes resulting in a series of negative going pulses of electrons to the anode. The negative pulse sequence is amplified electronically by amplifiers 46 and 48 and stored in a series of sample and hold circuits 52, 54, 56, 58 and 60.

Referring to FIG. 6, it is seen that the various input leads are designated with a "−" or a "+". The "−" designation indicates that the input signal is inverted in polarity and the "+" designation indicates a non-inverting of the input signal. As an example, a negative pulse from the electron multiplier 42 is inverted by the "−" input to amplifier 46 so that amplifier 46 provides an output signal having a "+" designation. The "+" signal from amplifier 46 is inverted to a "−" polarity by amplifier 48 such that amplifier 48 provides a "−" output signal which is transmitted to the respective sample and hold circuits.

The sample and hold circuits are used to reconstruct the DC signal amplitude of each port. Each sample and hold circuit, 52-60, is connected with the timer and modulator 44. Thus, the amplifiers 46 and 48 treat the negative pulses from the anode of the ion-electron multiplier 42 and deliver these pulses to the respective sample and hold circuits which are timed with the port transmission sequence. Hence, when port 12 is active, sample and hold circuit 52 is engaged.

The signal from sample and hold circuits 52 and 54 and the sample and hold circuits 56 and 58 are processed electronically through difference amplifiers 64 and 66, respectively, to obtain the difference between ports 12 and 14 and between ports 16 and 18, thereby eliminating thermal ion response. The output signals of the difference amplifiers 64 and 66 are angle related signals as shown in FIG. 7 and eliminate currents due to the ion thermal motion.

The output signals from difference amplifiers 64 and 66 form the input to a difference amplifier 68 which yields an attitude related signal, output A, extracted from the difference obtained between the signals from amplifiers 64 and 66. Hence, the difference signals between the selected port pairs, when treated as indicated by equation 8, yield a signal directly related to the attitude angle projected on the plane of the ports.

In order to avoid signal ambiguity, the signal from amplifier 64 is inverted by the inverter 70 and the signal difference extracted between the output of inverter 70, which is the inversion of the amplifier 64 signal, and the output signal from amplifier 66 through a difference amplifier 72. The output B of difference amplifier 72 also is an attitude related signal.

Figure 7:
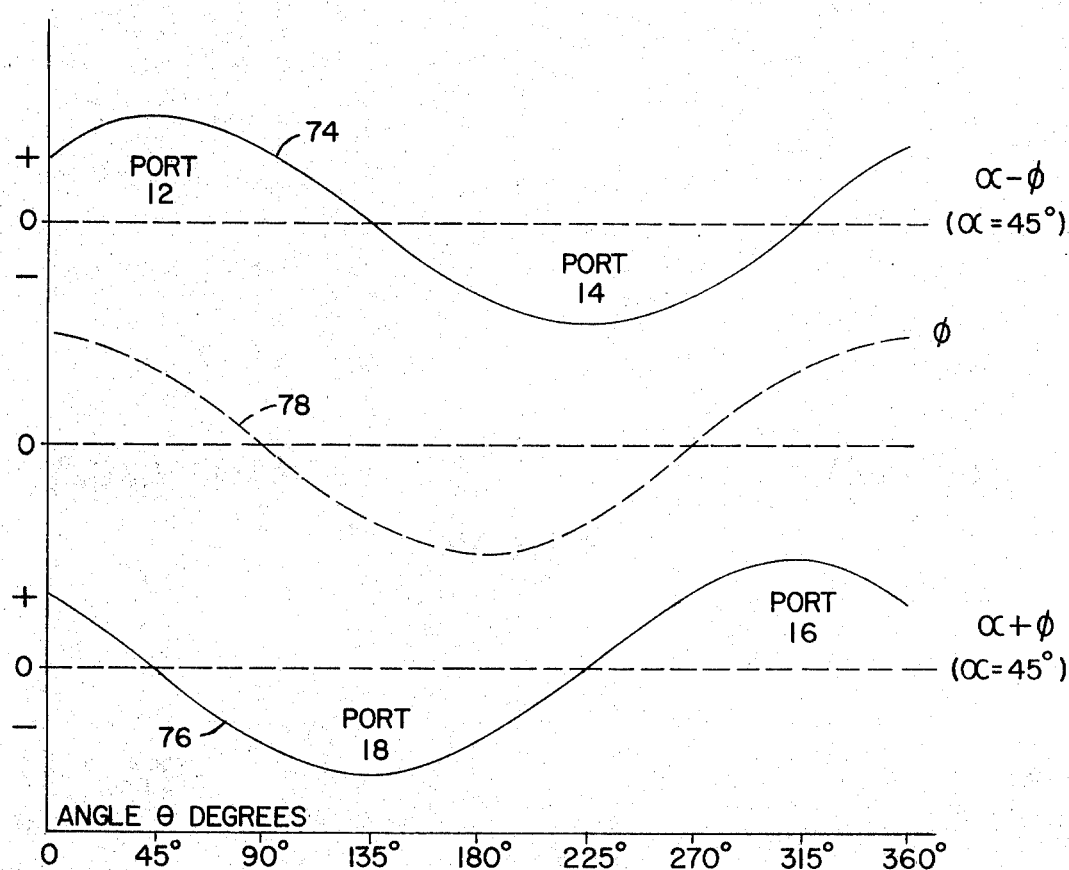
FIG. 7 is a graph showing the outputs of the difference amplifiers as angle related signals.
Figure 8:
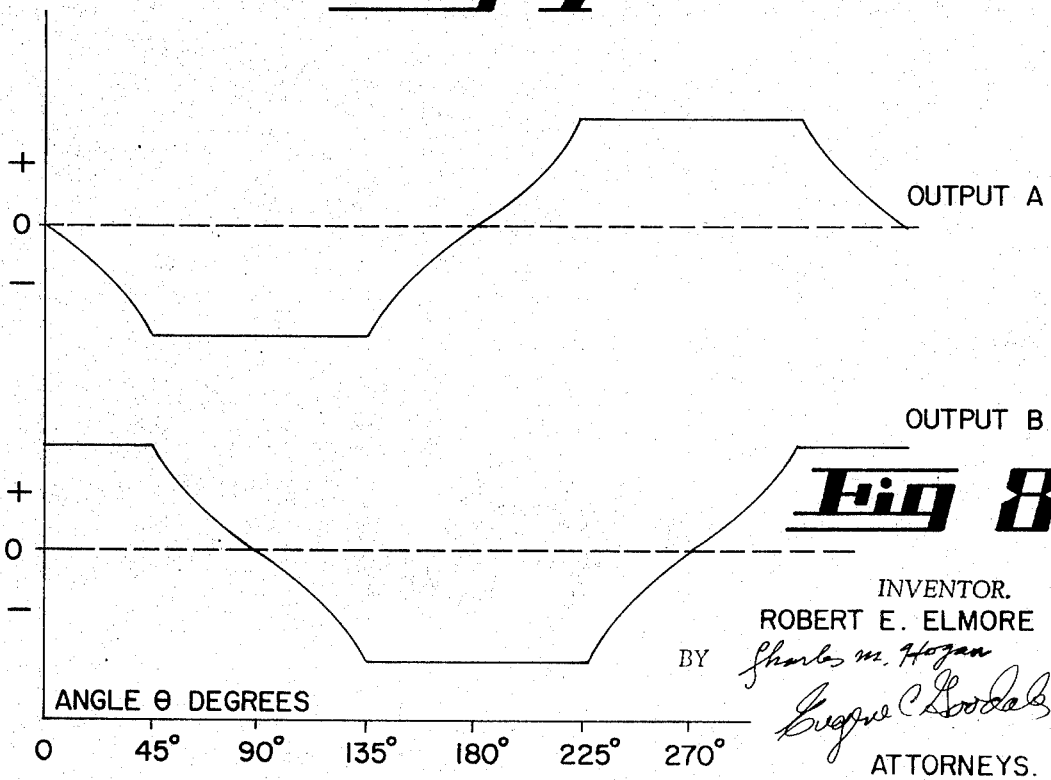
FIG. 8 is a graph of outputs A and B of FIG. 6 indicating the instrument response to ion sensing.

The output value A of FIGS. 6 and 8 may be derived from consideration of FIG. 7. The signals from ports 12 and 14, after cancellation of the thermal ion effects, appear at the output of amplifier 64 as a sine function 74 related to the device attitude. Similarly, the signals of ports 16 and 18 appear at the output of amplifier 66 as a sine function 76, also related to the device attitude. These two sine functions differ in phase by 90°, as shown in FIG. 7, and therefore, an intermediate sine function 78 may be introduced into the system which leads the output of amplifier 64 by 45° and lags the output of amplifier 66 by 45°.

Figure 4:
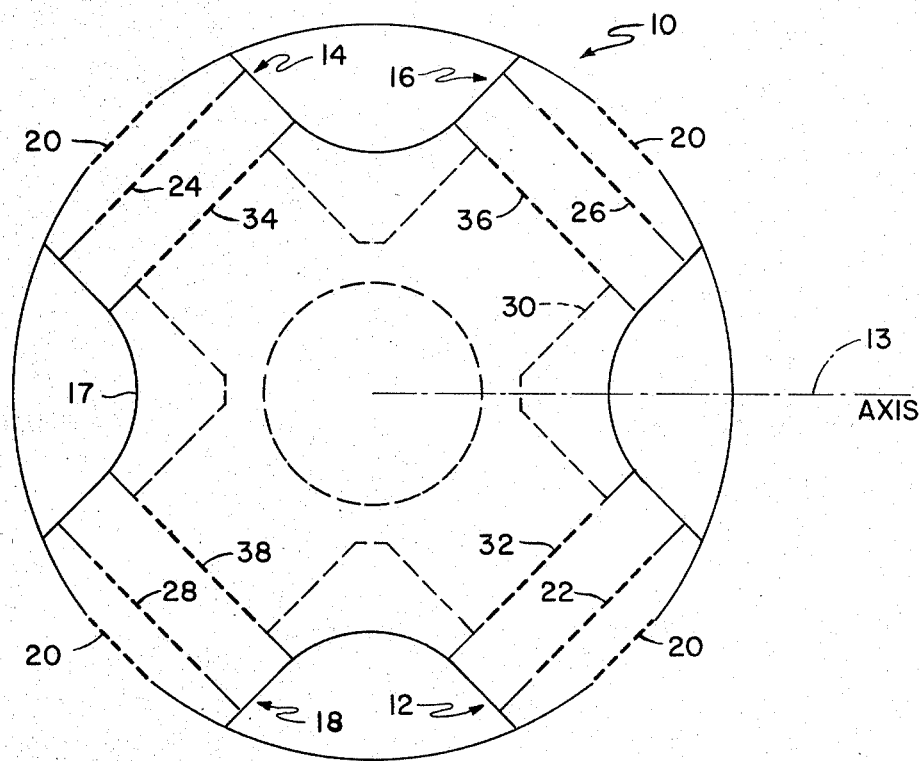
FIG. 4 is a diagrammatic plan view of the ionic sensor of this invention.
Figure 5:
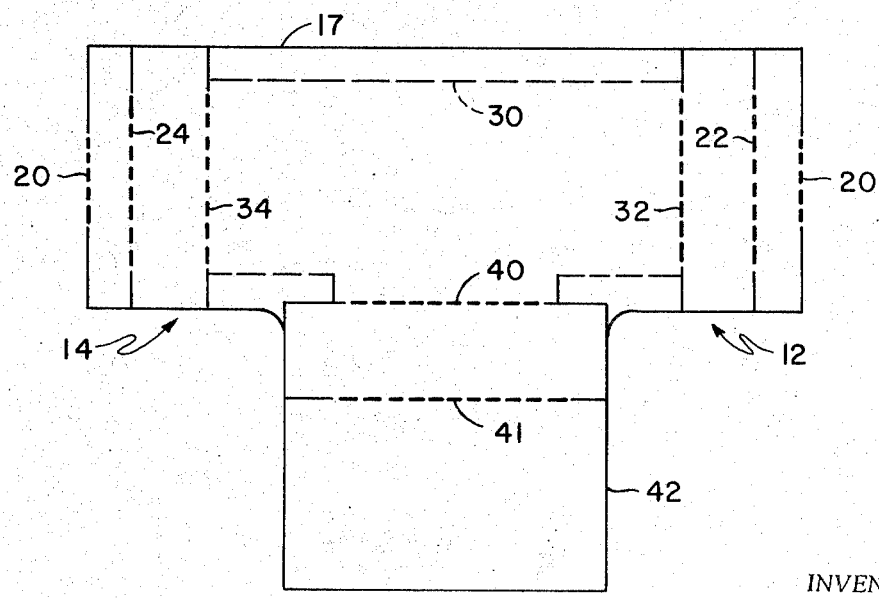
FIG. 5 is a diagrammatic elevation view of the sensor of this invention showing 180° disposed ports.

Referring to FIGS. 4 and 7, let it be assumed that the direction of travel of the spacecraft 11 is such that the velocity vector angle $\theta$ is 0°. In this condition, ports 12 and 16 both receive an equal amount of ions entering through the ports during the respective port active time, as do ports 14 and 18, and thus the signals generated by difference amplifiers 64 and 66 would be positive as shown in FIG. 7 when angle $\theta$ is 0°. As the spacecraft 11 starts to rotate about the axis of sensor 10, such as in a counterclockwise direction, the angle $\theta$ begins to increase. Because of this rotation, the port 12 will start to receive more ions during its active time while the ion flow through port 16 decreases. Thus, when the spacecraft 11 has rotated at an angle $\theta$ of 45°, the port 12 will be aligned with the velocity vector as projected on the plane of the ports and receives maximum ion flow therethrough. Referring again to FIG. 7, it is seen that the signal 74 generated by difference amplifier 64 at this condition is maximum positive indicating that the port 12 is aligned directly with the projected velocity vector. The signal 76 generated by difference amplifier 66 is at zero potential. As the spacecraft 11 continues to rotate in a counterclockwise direction in the plane of the sensor, the port 12 now starts to move away from the velocity vector and hence less ion flow will pass therethrough and it is seen that the signal 74 starts decreasing and reaches a zero potential when angle $\theta$ is 135° such that ports 12 and 14 are both perpendicular to the projected velocity vector.

Referring again to FIG. 7 and in which the angle $\theta$ is 45°, it is seen that ports 16 and 18 are perpendicular to the projected velocity vector. However, as the spacecraft 11 continues to rotate counterclockwise, port 18 begins to receive more ions during its active time and due to the circuitry of FIG. 6, the output signal 76 of difference amplifier 66 increases in the negative direction until angle $\theta$ equals 135° at which time port 18 is directly aligned with the projected velocity vector. As the spacecraft 11 continues to rotate in the counterclockwise direction, the difference amplifiers 64 and 66 will continue to generate output signals 74 and 76 as shown in FIG. 7. Thus, when angle $\theta$ is 225°, the port 14 is directly aligned with the projected velocity vector such that a maximum negative signal is generated by difference amplifier 64; and when angle $\theta$ is 345°, the port 16 is directly aligned with the projected velocity vector such that the difference amplifier 66 provides a maximum positive signal.

The current generated by a two port device within its physical and electrical envelopes may be mathematically expressed as follows:

$$(I_1 - I_2)/(I_1 + I_2) \quad (12)$$

Then, letting $\phi$ represent both the intermediate sine function 78 of FIG. 7 and the attitude angle plus 90°, and $\alpha$ the 45° angle of lead or lag from the outputs of amplifiers 64 and 66 and employing the general form of equation 12 with the restriction that only absolute values are used in the denominator results in the following equation:

$$[\text{Sin}(\phi + \alpha) - \text{Sin}(\phi - \alpha)]/[\text{Sin}(\phi + \alpha) + \text{Sin}(\phi - \alpha)] = \tan\alpha/\tan\phi \quad (13)$$

Noting from FIG. 7 the relationship of $\phi = \theta + 90°$, the following is readily obtained; for $\theta$ from zero to +45°, $\theta$ varies from 90° to 135° and equation becomes $$[\text{Sin}(\phi + \alpha) - \text{Sin}(\phi - \alpha)]/[\text{Sin}(\phi + \alpha) + \text{Sin}(\phi - \alpha)] = \tan\alpha/\tan\phi = \cot\phi = \cot(\theta + 90) = -\tan\theta \quad (14)$$

Additional values for $\theta$ are listed below:
For $\theta$ from 45° to 135° Tan $\alpha$ /tan $\theta$ = −1
For $\theta$ from 135° to 255° Tan $\alpha$ /tan $\phi$ = tan $\theta$
For $\theta$ from 225° to 315° Tan $\alpha$ /tan $\theta$ = +1
For $\theta$ from 315° to zero Tan $\alpha$ /tan $\theta$ = −tan $\theta$ The output value B of FIGS. 6 and 8 may be derived in a similar manner by noting the output of amplifier 64 is shifted through 180° by inverter 70.

Both output signals A and B contain attitude information and by utilizing logic circuitry (not shown) may be employed to directly indicate the projected attitude angle as hereinbefore defined; i.e., the angular separation of the vehicle axis relative to the component of the velocity vector as measured in the plane of the sensor ports. The output signals A and B are graphically indicated in FIG. 8 and eliminate ambiguity when both outputs are considered together. Thus, if the output signal A is a negative potential, examination of the output signal A alone will not tell which quadrant the angle $\theta$ is in, i.e., whether between 0° and 45° or between 135° and 180°. However, this ambiguity is eliminated by considering output B simultaneously with output A. Thus, if output B is maximum positive potential, it is known that the angle $\theta$ is in the first quadrant, i.e., between 0° and 45°. However, if the output B is maximum negative potential, it is seen that the angle $\theta$ is in the quadrant between 135° and 180°.

Amplifiers 80 and 82 are used as combination inverters and drivers to obtain the sum of the signal differences between ports 12 and 14 and between ports 16 and 18. The sum of the output signals from amplifiers 80 and 82, which is the sum of the differences, is applied as one input to an integrator amplifier 84. If difference amplifier 64 provides a minus signal, this signal will be transmitted to the inverter driver amplifier 80 through diode 88. However, this negative signal is inverted and the output signal from amplifier 80 is positive. In addition, if the difference amplifier 64 provides a positive output signal, such signal is transmitted through diode 90 to the inverter driver amplifier 80. Thus, it can be seen that amplifier 80 only provides a positive output signal. Similarly, if difference amplifier 66 provides a negative output signal, such signal is transmitted through diode 92 to the inverter driver amplifier 82 wherein the negative signal is inverted to a positive signal. If the difference amplifier 66 provides a positive output signal, then the positive signal is transmitted through diode 94 to the inverter driver amplifier 82 and it is again seen that the output from amplifier 82 is a positive signal for both cases. Then, the sum of the two positive outputs of amplifiers 80 and 82 are applied as the one input to integrator amplifier 84.

A reference signal provides the second input to the integrator amplifier 84. The output signal from the integrator amplifier 84 is applied to a variable power supply 86 which applies a potential to the ion-electron multiplier 42 necessary to maintain the sum of the differences at a constant level. Thus, if the sum of the differences of the signals from amplifiers 80 and 82 is higher than the reference input signal to the integrator amplifier 84, the variable power supply is lowered and if the sum of the differences is lower than the reference signal, the voltage from the variable power supply 86 is transmitted to the electron multiplier 42 is increased.

The invention has been described with reference to a four-port ion sensor. As was disclosed, the sensor may be comprised of any port array configuration where the port array is 2(n+1), where n is any positive number other than zero. Should the port array change, it is only necessary to change the electronics, as shown in FIG. 6, to accommodate the additional pairs of ports.

Although operation of this invention has been described herein for positive ions, selective reversal of internal potential will yield the identical capability for utilizing electron flow rather than ion flow.

It can be seen that this invention provides an ion sensor which is omnidirectional in scope in the plane of the ports and compensates for undesirable effects of intrinsic isotropic velocities of charged particles and the undesirable effects of electromagnetic radiation and energetic charged particles which ordinarily degrade accuracy. Thus, it is seen that the objects of this invention hereinbefore set forth have been accomplished.

While a present exemplary embodiment of this invention has been illustrated and described, it will be recognized that this invention may be otherwise variously embodied and practiced by those skilled in the art.

What is claimed is:

1. A sensor having a plurality of coplanar ports for use in a vehicle in motion through a gaseous medium for determination of the angular separation measured in the plane of the sensor ports of the vehicle axis relative to the component of the vehicle velocity vector lying in the plane comprising:

a plurality of ports arranged above a central axis in a plane normal to the axis, said central axis being normal to the vehicle axis, the port openings being directed radially outward and equally spaced from said axis and diametrically arrayed at equal angular intervals, each of said ports being formed with a target area having an active and inactive condition;

control means to sequentially activate the target area in each of said port openings such that when one target area is activated all other target areas are inactive whereby said target area permits charged particle flow therethrough;

a detector in flow communication with said ports for receiving the charged particles from the active port, said detector providing a signal in response thereto; and circuit means responsive to said detector signals, said circuit means combining said signals to provide information for determining, independent of non-attitude related variations of said detector signals and said circuit means, the angular separation between the axis of the vehicle and the velocity vector of said vehicle as measured in the plane of the ports when the central axis of the sensor is normal to the vehicle axis.

2. A sensor as set forth in claim 1 in which said ports comprise a plurality of port arrays in which each port array includes two ports disposed diametrically and wherein said control means sequentially activates the first and second ports of one port array in timed sequence before activating another port array.

3. A sensor as set forth in claim 2 in which said circuit means includes first means responsive to detector signals resulting from activation of the first port of a port array and second means responsive to detector signals resulting from activation of the second port of the port array and difference means to combine the signals from the two ports of an array to provide a difference signal related to the port array independent of the effects of isotropic motion of charged particles in the medium.

4. A sensor as set forth in claim 3 in which said circuit means further includes summing means to sum the signals representing adjacent port arrays to cancel the effects of variations in the density of the charged particles in the partially ionized gaseous medium as well as variations in vehicle velocity.

5. A sensor as set forth in claim 4 further including means to cause said adjacent port arrays signal sum to be a constant value.

6. A sensor as set forth in claim 5 further including second difference means to combine the respective summed signals from adjacent port arrays thereby providing a first attitude responsive signal related to the angular separation between the axis of said vehicle and said velocity vector as measured in the plane of the ports.

7. A sensor as set forth in claim 6 further including inverting means to invert the polarity of one of the summed port array signals, third difference means to combine the inverted signal with the other of the summed port array signals to provide a second attitude responsive signal related to the angular separation between the axis of said vehicle and said velocity vector wherein the combining of the first and second attitude responsive signals provide an indication related to the angular separation between the axis of the vehicle and the velocity vector component in the plane of the ports.

8. A sensor as set forth in claim 7 in which said central means includes a time sequence when all said ports are in the inactive condition and further comprising sample and hold means for receiving background signals not associated with the charged particle flow during the all port inactive condition, said sample and hold means providing a non-attitude related signal.

9. A sensor as set forth in claim 8 further comprising integrator means for combining the non-attitude related signals and a reference signal, said integrator means providing a cancelling signal to said circuit means to cancel non-angle related responses.

* * * * *